No. 644,588. Patented Mar. 6, 1900.
M. J. FLAVIN, J. T. MORIARTY & P. A. FLAVIN.
BELT DRUM FOR BELT POLISHING MACHINES.
(Application filed Oct. 16, 1899.)
(No Model.)
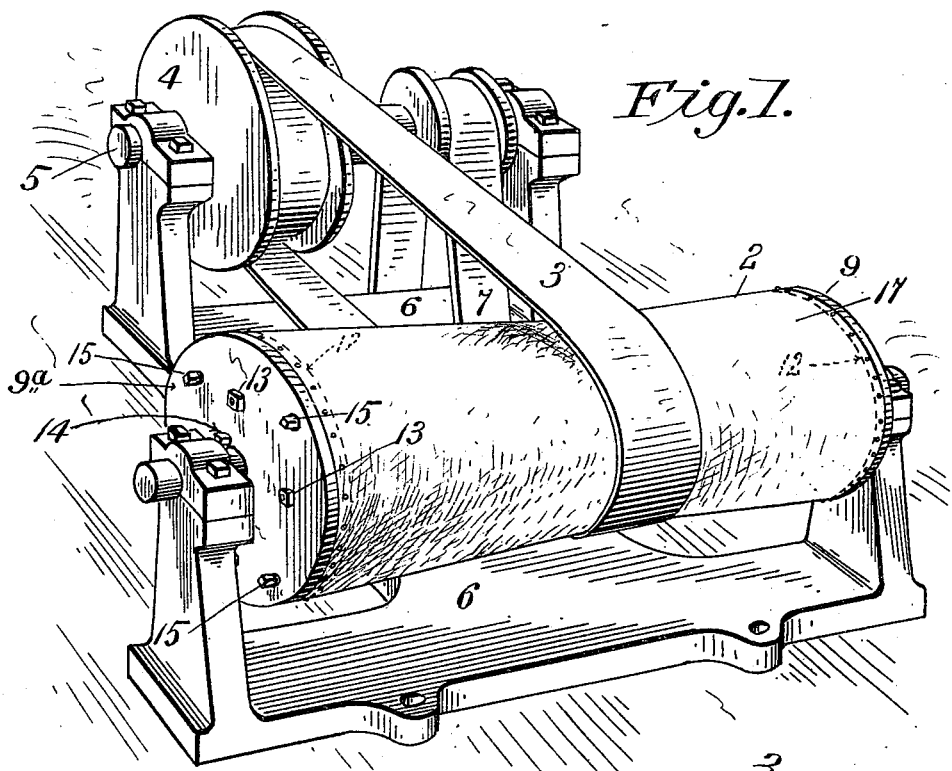
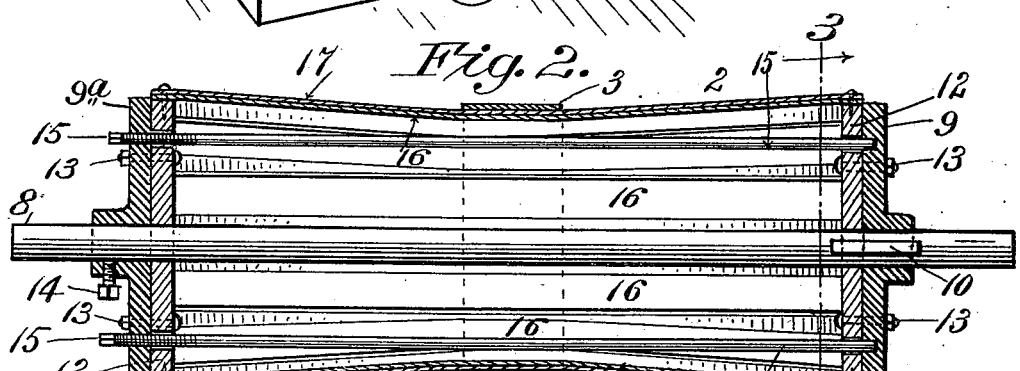
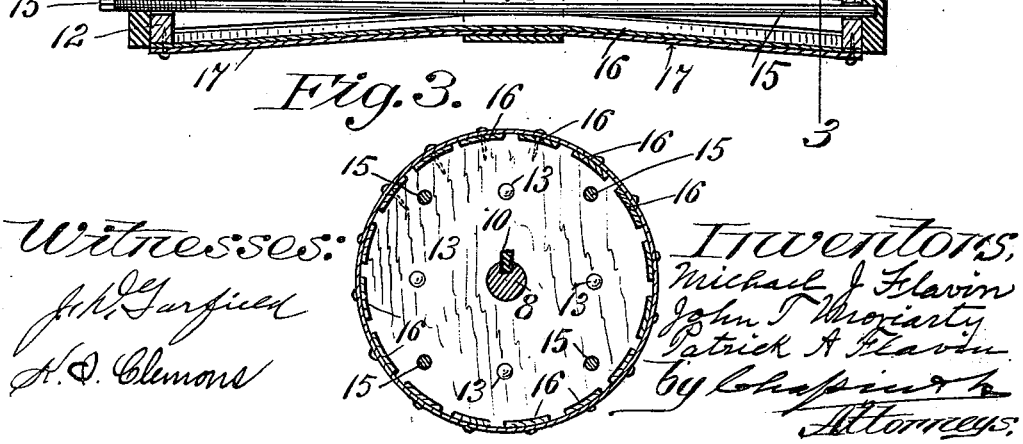
THE NORRIS PETERS CO., PHOTO-LITHO., WASHINGTON, D. C.

UNITED STATES PATENT OFFICE.

MICHAEL J. FLAVIN AND JOHN T. MORIARTY, OF CHICOPEE FALLS, AND PATRICK A. FLAVIN, OF ATHOL, MASSACHUSETTS.

BELT-DRUM FOR BELT-POLISHING MACHINES.

SPECIFICATION forming part of Letters Patent No. 644,588, dated March 6, 1900.

Application filed October 16, 1899. Serial No. 733,752. (No model.)

*To all whom it may concern:*

Be it known that we, MICHAEL J. FLAVIN and JOHN T. MORIARTY, residing at Chicopee Falls, in the county of Hampden, and PATRICK A. FLAVIN, residing at Athol, in the county of Worcester, State of Massachusetts, citizens of the United States, have invented new and useful Improvements in Belt-Drums for Belt-Polishing Machines, of which the following is a specification.

This invention relates to devices for belt-polishing articles, and particularly those made of wood, the object being to provide improved devices of this class which obviate the danger of discoloring said articles by frictionally overheating the same in polishing them.

The invention consists in a pulley of particular construction and in its connection to the shaft, substantially as herein described, and summarized in the claims.

In the drawings forming part of this specification, Figure 1 is a perspective view illustrating the frame of a polishing-machine, in which is shown a belt-carrying drum or pulley embodying our invention, this figure showing also a belt-driving shaft having a pulley thereon to receive the polishing-belt and the said belt in operative position on said drum and pulley. Fig. 2 is a longitudinal section of said drum; and Fig. 3 is a transverse section of the drum on line 3 3, Fig. 2.

Referring to the drawings, 2 indicates the belt-carrying drum, 3 the polishing-belt, and 4 the driving-pulley of the polishing-frame, said driving-pulley being carried on a shaft 5, and the latter being suitably supported on said frame (the frame *per se* being indicated by 6) and driven from any suitable motor source by a belt 7. The belt-carrying drum 2 comprises a shaft 8, spline-connected with the hub of one of the heads 9 or 9ª thereof, as shown in Figs. 2 and 3, wherein said spline is indicated by 10. The said heads 9 and 9ª are of the usual iron construction; but each has preferably a lining-disk 12 of wood, said disks being secured to the heads by bolts and nuts 13. (See Figs. 1 and 2.) The head 9ª is adapted to be rigidly fixed in different positions near one end of the shaft 8 by a set-screw 14, and the head 9 is movable on the shaft toward and from the adjoining end thereof for a purpose below described, as follows: A series of rods 15—say four, more or less—each extending from outside one of said heads 9 or 9ª into a socket in the opposite head, are embodied in the construction of the frame of the drum 2, the outer end of each of said rods being squared or otherwise formed, so that a wrench may be applied thereto for turning it, and each having a screw-thread connection with said fixed drum-head 9ª. By the use of these rods means are provided for so adjusting the head 9 relative to the opposite head that the space between the two heads is reduced or increased for producing certain effects relative to the cover 17 of the drum below set forth. The said drum-cover or cylindrical body comprises a series of strips of canvas 16, extending from head to head thereof, the ends of which are firmly secured to the peripheries of the lining-disks 12 of the heads by nailing or otherwise. In practice said strips lie rather nearer each other than is shown in Fig. 3, and they form a strong, but yielding, base for the below-described cover proper of the drum. The use to which the drum 2 is subjected requires that its cover-surface shall be of strong, firm, and yet flexible material, and consequently the textile fabric known as "bedticking" is used and is found to satisfactorily fill said conditions. This outer cover 17 is also firmly nailed or otherwise secured by its ends to the peripheries of said disks 12, or the ends may be clamped between said heads and disks, and the meeting longitudinal borders of said cover 17 are firmly stitched together. The cover 17 is thus a continuous tube extending from end to end of the pulley and forming a continuous support for a belt. Said disks 12 may be secured on the outsides of the heads 9 and 9ª, if preferred, and, if desired, the ends of said cover material may be secured directly to the peripheries of the iron heads and the said disks may be omitted.

As above constructed, the drum has a firm, but yielding, cover, on which said polishing-belt 3 may run, and one which may be adjusted, as described, by the aforesaid rods 15 to any desired resistance to deflection.

The polishing-belt 3 may be of any preferred construction, according to the work it may be used on.

In using the within-described devices for polishing it will be obvious to a skilled polisher that the tension of the cover of the drum may be adjusted to any required degree by turning said rods 15, as described, to vary the separation of the heads of the drum.

It may be understood that the head 9ª is generally fixed to the shaft by set-screw 14, but may be moved on the shaft by releasing the set-screw and fastened in a new position, if desirable; also, that the screw-threaded rods 15, which extend through said head 9ª, may be projected more or less—that is, screwed out or in—by turning said rods on their own axes, as is common in turning a screw out or in. The round ends of the rods turning in sockets in head 9 will press said head farther away from head 9ª when the screws are turned in the proper direction. The cover 17 and strips 16 and the draft or tension of the belt 3, operating on the covering 17 of the pulley, will tend to draw the head 9 firmly against the ends of rod 15, and so hold the various parts of the pulley in a sufficiently taut relation for practical purposes—that is, the rods 15 act merely as spreaders and the cover of the pulley acts to greater or less extent in resistance to the spread or separation of the heads.

Fig. 1 indicates a certain depression of the drum-surface caused by the draft of the polishing-belt 3 thereon, and such depression, more or less, will be ordinarily present while the drum is in use.

Having thus described our invention, what we claim, and desire to secure by Letters Patent of the United States, is—

1. A drum for belt-polishing machines, comprising two rigid circular heads, a continuous flexible tube of textile material extending over and attached directly to the periphery of these heads, said tube extending from one head to the other, and means for securing the heads at various distances apart on the shaft, so that the tube may sag more or less between the heads, substantially as described.

2. A drum for belt-polishing machines, comprising two rigid heads or disks, a number of strips of flexible material extending from head to head and secured thereto, a tube of flexible material outside such base-strips, and adjustable means for holding the heads a greater or lesser distance apart, substantially as described.

3. A drum for belt-polishing machines consisting of two rigid circular heads, a continuous flexible tube having its ends securely attached to said heads, and a plurality of rods bearing on one head, extending inside the tube, and adjustably connected to the other head, by which rods the distance between the heads may be regulated, all combined substantially as described.

4. In a belt-polishing machine, the combination of the shaft, a drum-head or disk fixed on said shaft, a drum-head or disk longitudinally movable on the shaft but compelled to rotate therewith, means for adjusting these heads to different relative positions, and a continuous tube of non-elastic flexible material permanently attached at its ends to both the said heads, all substantially as described.

5. In a belt-polishing machine, the shaft, a disk fixed thereon and a disk rotating with the shaft but movable lengthwise thereof, spreader-rods extending from one disk to the other and engaging one of the disks by screw engagement, so as to adjust the distance between the heads, a continuous tube of flexible material connecting the peripheries of the disks, all combined substantially as described.

MICHAEL J. FLAVIN.
JOHN T. MORIARTY.
PATRICK A. FLAVIN.

Witnesses:
H. A. CHAPIN,
WM. H. CHAPIN.